US009322933B2

United States Patent
Zhao et al.

(10) Patent No.: US 9,322,933 B2
(45) Date of Patent: Apr. 26, 2016

(54) MULTIPLE TECHNOLOGIES COMPOSITE SCINTILLATION DETECTOR DEVICE

(71) Applicants: NUCTECH COMPANY LIMITED, Beijing (CN); TSINGHUA UNIVERSITY, Beijing (CN)

(72) Inventors: Ziran Zhao, Beijing (CN); Zhiqiang Chen, Beijing (CN); Yuanjing Li, Beijing (CN); Wanlong Wu, Beijing (CN); Yinong Liu, Beijing (CN); Ming Ruan, Beijing (CN); Yingkang Jin, Beijing (CN); Le Tang, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/576,674

(22) Filed: Dec. 19, 2014

(65) Prior Publication Data
US 2015/0185335 A1 Jul. 2, 2015

(30) Foreign Application Priority Data
Dec. 30, 2013 (CN) .......................... 2013 1 0746145

(51) Int. Cl.
*G01T 1/20* (2006.01)
(52) U.S. Cl.
CPC ............. *G01T 1/2002* (2013.01); *G01T 1/2008* (2013.01)
(58) Field of Classification Search
CPC ........................... G01T 1/2002; G01T 1/2008
See application file for complete search history.

(56) References Cited

U.S. PATENT DOCUMENTS 4,398,092 A   8/1983   Carlson

FOREIGN PATENT DOCUMENTS

EP   2 597 490 A1   5/2013
WO   2013/076279 A1   5/2013

OTHER PUBLICATIONS

Ananenko, A. A. et al., "Scintillation Parameters of a Phoswich beta- and gamma-Ray Detector," Instruments and Experimental Techniques, vol. 45, No. 2, (2002), pp. 178-182.
May 8, 2015 Extended Search Report issued in European Patent Application No. 14199176.0.

*Primary Examiner* — Mark R Gaworecki
(74) *Attorney, Agent, or Firm* — Oliff PLC

(57) ABSTRACT

The invention presents a backscattering scintillation detector. The scintillation detector includes a scintillation crystal detector; a X-ray sensitizing screen, which is disposed forward the scintillation crystal detector and where a backscattered X-ray from an object to be detected is processed and then at least part of the processed X-ray is incident to scintillation crystal detector; and photoelectric multiplier, which is disposed backward the scintillation crystal detector and is configured to collect a light signal from scintillation crystal detector and convert it to an electrical signal. Through the above preferable embodiment, a X-ray sensitizing screen, a scintillation crystal detector, and light guiding and wave-drifting technologies are combined together to obtain a novel scintillation detector, which can improve detection of X-ray, transmission of light signal and conversion of light signal to electrical signal.

20 Claims, 2 Drawing Sheets

MULTIPLE TECHNOLOGIES COMPOSITE SCINTILLATION DETECTOR DEVICE

CROSS-REFERENCE TO RELATED APPLICATIONS

This application claims the benefit of Chinese patent application No. 201310746145.1, filed on Dec. 30, 2013 with State Intellectual Property Office of China, and the inventions of which are incorporated herein in its entirety by reference.

BACKGROUND OF THE INVENTION

1. Field of the Invention

The present invention relates to a scintillation detector device, and particularly, to a backscattering scintillation detector device which involves multiple technologies and can be applied in security inspection for, such as, human body, vehicle, etc.

2. Description of the Related Art

X-ray backscattering imaging technology is one of the main technology in field of security inspection for human body or vehicle. Through scanning human body or vehicle by X-ray while receiving X-ray backscattering signal by using a large-size backscattering detector, a backscattering image by X-ray of an object being scattered can be obtained by collecting the scattered signal and processing related data.

As for backscattering security inspection technology, quality of image and detection rate of an object to be detected heavily relies on the performance of a backscattering detector device. For example, the conventional backscattering detector usually adopts one single type of detector, such as scintillation detector or gas detector. However, the conventional backscattering detector is insufficient for effective detection for X-ray, light collection and light conversion, which becomes a bottleneck of improvement of detection performance of a backscattering detecting device.

In order to improve detecting properties of a backscattering detector to make the backscattering technology play a more important role in the security inspection field, it is necessary to provide a novel backscattering scintillation detector device which may at least effectively reduce or eliminate at least one aspect of the above mentioned problems.

SUMMARY OF THE INVENTION

It is an object of the present invention to solve at least one aspect of the above technical problems and defects in the prior art.

Accordingly, an object of the present invention is to provide a backscattering scintillation detector device, which is able to detect both high-energy part of and low-energy part of the X-ray.

Another object of the present invention is to provide a backscattering scintillation detector device, which can more effectively detect radiation and can transmit and convert more effectively a light signal into an electrical signal.

According to an aspect of the present invention, there is provided a backscattering scintillation detector device, comprising: a scintillation crystal detector; a X-ray sensitizing screen disposed forward the scintillation crystal detector where backscattered X-ray from an object to be detected is processed and then at least part of the processed X-ray is incident to the scintillation crystal detector; and a photoelectric multiplier, disposed backward the scintillation crystal detector and configured to collect a light signal from the scintillation crystal detector and convert it to an electrical signal.

Preferably, the backscattering scintillation detector device further comprises a reflective layer, which is disposed forward the X-ray sensitizing screen and is configured to reflect a light signal from the X-ray sensitizing screen.

Further, the backscattering scintillation detector device further comprises a light shielding layer, which is disposed forward the reflective layer and is configured to shield against a visible light entering into the backscattering scintillation detector device from outside.

Further, the backscattering scintillation detector device further comprises a photoelectric coupling medium, which is disposed between the scintillation crystal detector and the photoelectric multiplier and is configured to couple the light signal from the scintillation crystal detector with the light signal to the photoelectric multiplier.

Specifically, the X-ray sensitizing screen can be selected as a metal sensitizing screen, a fluorescent sensitizing screen or a metal-fluorescent combination sensitizing screen.

In the above mentioned embodiment, a metal composition of the metal sensitizing screen can be selected from plumbum, tungsten, tantalum, molybdenum, copper and iron.

In the above mentioned embodiment, the fluorescent sensitizing screen can be made of calcium tungstate or barium fluochloride.

Specifically, the X-ray sensitizing screen can be a rare earth sensitizing screen.

Specifically, the rare earth sensitizing screen is made from gadolinium sulfide-oxide material.

In an embodiment, the scintillation crystal detector is made of an organic scintillation crystal of polystyrene.

Further, the organic scintillation crystal of polystyrene is doped with a wave-drifting material for wave-drifting of a high-energy photon generated by the organic scintillation crystal of the sensitizing screen to a wave band where the photoelectric multiplier is sensitive.

In an embodiment, the reflective layer is formed of an aluminum foil material.

In an embodiment, the light shielding layer is made of a black packaging material.

In an embodiment, the photoelectric coupling medium is selected as industrial transparent silicone.

In an embodiment, the wave-drifting material can be Bis-MSB (chemical name: 1,4-di(ethyl-methylstyryl) benzene, with molecular formula of $C_{24}H_{22}$ and molecular weight of 310.44).

In the above embodiment, the at least part of X-ray which is incident to the scintillation crystal detector is interacted with the scintillation crystal in the scintillation crystal detector to be converted into a light signal.

In the above embodiment, a part of backscattered X-ray from the object to be detected is interacted with the X-ray sensitizing screen to be converted into a light signal and, after have been light-guided by the scintillation crystal in the scintillation crystal detector, is passed into and collected by the photoelectric multiplier.

In the above embodiment, a part of backscattered X-ray from the object to be detected is interacted with the X-ray sensitizing screen and a part of the interacted X-ray is escaped, and the escaped X-ray is interacted with the scintillation crystal in the scintillation crystal detector to be converted into a light signal.

Alternatively, the photoelectric multiplier is coupled to a back face or a side face of the scintillation crystal detector.

Specifically, the black packaging material can be a black PET film.

BRIEF DESCRIPTION OF THE DRAWINGS

These and/or other aspects and advantages of the present invention will become apparent and more readily appreciated from the following description of the embodiments, taken in conjunction with the accompanying drawings of which.

Figure 1:
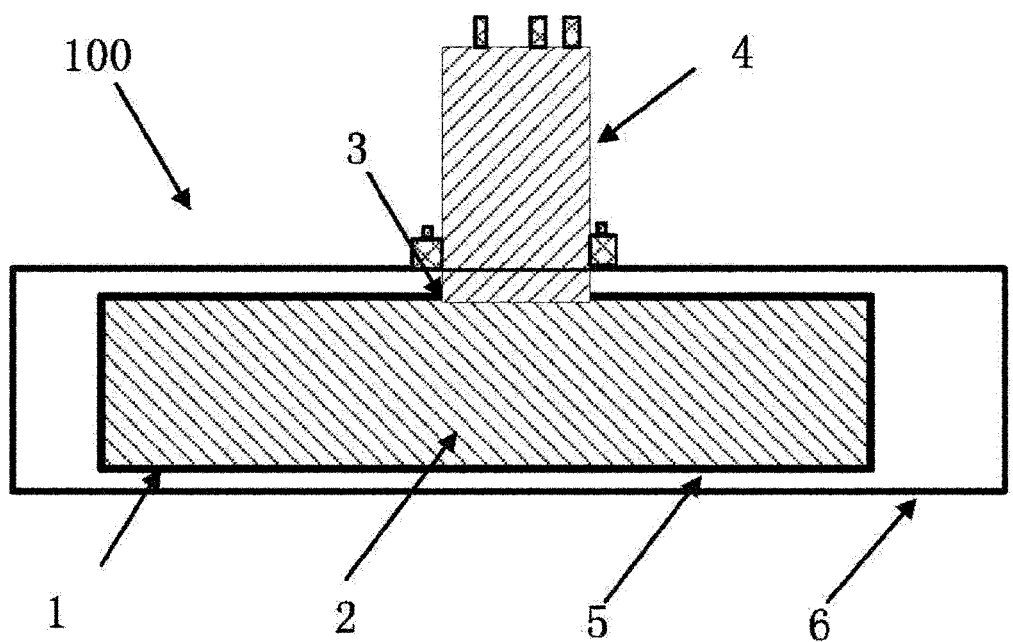
FIG. 1 illustrates a multiple technologies composite backscattering scintillation detector according to an embodiment of the present invention.

The scope of the present invention will in no way be limited to the simply schematic views of the drawings, the number of constituting components, the materials thereof, the shapes thereof, the relative arrangement thereof, etc., and are disclosed simply as an example of an embodiment.

DETAILED DESCRIPTION OF THE PREFERRED EMBODIMENT

Technical solutions of the present invention will be described hereinafter in more detail by the way of embodiment with reference to figures of the attached drawings, wherein the same or like reference numerals refer to the same or like elements throughout the specification. The explanation of the embodiment of the present invention with referring to the accompanying drawings is intended to expound the general inventive concept of the present invention, rather than being construed as limiting to the present invention.

Referring to FIG. 1, a backscattering scintillation detector device 100 according to an embodiment of the present invention is illustrated. The backscattering scintillation detector device 100 comprises a scintillation crystal detector 2, a X-ray sensitizing screen 1, which is disposed forward the scintillation crystal detector 2 and where a backscattered X-ray from an object to be detected is processed by the X-ray sensitizing screen 1 and then at least part of the processed X-ray is incident to the scintillation crystal detector 2, and a photoelectric multiplier 4, which is disposed backward the scintillation crystal detector 2 and is configured to collect a light signal from the scintillation crystal detector 2 and convert it to an electrical signal. Preferably, the backscattering scintillation detector device 100 further comprises a reflective layer 5, which is disposed forward the X-ray sensitizing screen 1 and is configured to reflect a light signal from the sensitizing screen 1, and a light shielding layer 6, which is preferably disposed forward the reflective layer 5 and is configured to shield against the visible light entering into the backscattering scintillation detector device 100 from the outside. The mentioned term of "forward" and "backward" herein is used with reference to the optical path. The term of "forward" means proximal position along the optical path of the backscattered X-ray and "backward" means distant position along the optical path of the backscattered X-ray.

A X-ray sensitizing screen is usually used in medical or industrial X-ray transmission imaging field. Generally, a X-ray sensitizing screen is formed by uniformly coating agent on a paper or a colloid sheet. The coating agent can be selected from a group of a metal material, a fluorescent material and metal and fluorescent composite material. In the above embodiment, the X-ray sensitizing screen 1 can be a metal sensitizing screen, a fluorescent sensitizing screen or a metal-fluorescent combination sensitizing screen. In detail, a metal composition of the metal sensitizing screen can be selected from plumbum, tungsten, tantalum, molybdenum, copper and iron. The fluorescent sensitizing screen can be selected from calcium tungstate type sensitizing screen or barium fluochloride type fluorescent sensitizing screen. In a preferable embodiment of the present invention, the fluorescent sensitizing screen can be barium fluochloride type fluorescent sensitizing screen. Alternatively, a rare earth sensitizing screen can be used, such as, a rare earth sensitizing screen made from gadolinium sulfide-oxide material.

As shown in FIG. 1, the backscattering scintillation detector device 100 further comprises a photoelectric coupling medium 3 which is disposed between the scintillation crystal detector 2 and the photoelectric multiplier 4 and is configured to couple the light signal between the scintillation crystal detector 2 and the photoelectric multiplier 4.

In an embodiment, the scintillation crystal detector 2 is formed with an organic scintillation crystal of polystyrene. The present invention is not limited to this for those skilled in the art and any type of scintillation crystal detector, such as, a semiconductor scintillation crystal detector, can be alternatively used herein. Further, the scintillation crystal detector 2 can be doped by a wave-drifting material, such as, Bis-MSB wave-drifting material (chemical name: 1,4-di(ethyl-methylstyryl) benzene, with molecular formula of $C_{24}H_{22}$ and molecular weight of 310.44), which is used for wave-drifting of a high-energy light generated by the organic scintillation crystal or the sensitizing screen to a wave band where the photoelectric multiplier is sensitive.

In addition, the reflective layer 5 is made of an aluminum foil material. The light shielding layer 6 is made of a black packaging material, such as, a black PET film (black high-temperature resistance polyester film). The reflective layer 5 and the light shielding layer 6 are composed of a transparent material with respect to X-ray. The photoelectric coupling medium 3 is preferably made of an industrial transparent silicone, such as, BC-600 type industrial transparent silicone (made in Saint-Gobain).

A working process of the scintillation crystal detector device according to an embodiment of the present invention is described with reference to FIG. 2.

Figure 2:
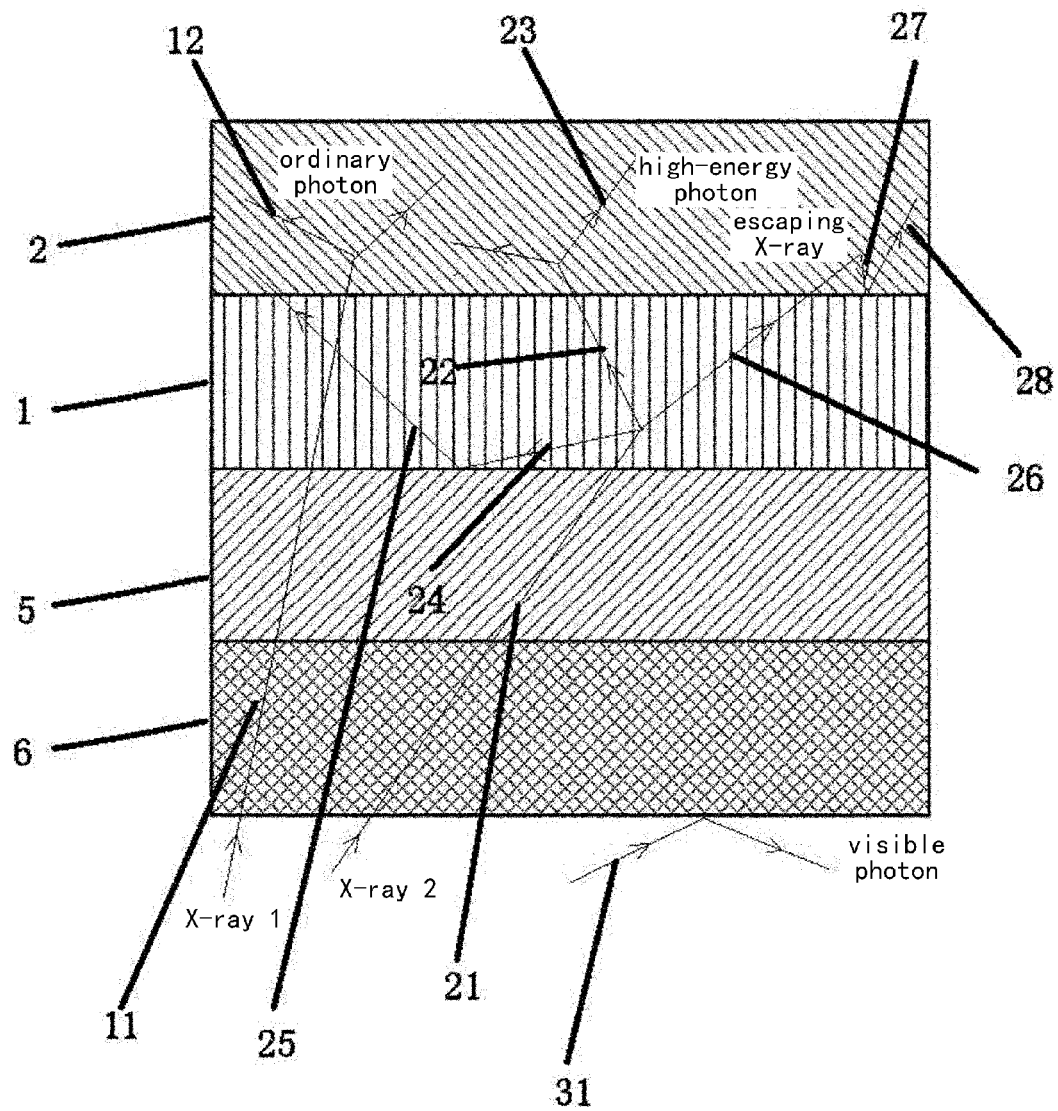
FIG. 2 is a schematic view of inside interaction process of X-ray with the sensitizing screen and the scintillation crystal in the backscattering scintillation detector in FIG. 1.

Backscattered X-rays from an object to be detected, such as X-ray 1 and X-ray 2 illustrated in FIG. 2, are incident to a scintillation crystal detector device 100, In this embodiment, the X-ray 1 denotes a X-ray with higher energy and X-ray 2 denotes a X-ray with lower energy. As shown in FIG. 2, the backscattered X-ray 1 from the object to be detected is directly penetrated through the light shielding layer 6, the reflective layer 5 and the X-ray sensitizing screen 1 along light path 11, and is incident into the scintillation crystal detector 2, where the backscattered X-ray is interacted with the organic scintillation crystal of polystyrene, thereby generating a light signal. The generated light signal is passed along an optical path 12 and is collected and converted by the photoelectric multiplier 4 to an electrical signal. Herein, the photoelectric multiplier 4 is configured to convert an optical signal to an electrical signal and output the electrical signal to subsequent electronic circuit after being amplified.

On the other hand, another part of backscattered X-ray from the object to be detected, i.e., X-ray 2, is directly penetrated through the light shielding layer 6, the reflective layer 5 along an light path 21 and is incident to the X-ray sensitizing screen 1, where the another part of backscattered X-ray is interacted with the X-ray sensitizing screen, thereby generating such as high-energy photons, ordinary photons and escaping X-ray.

Referring to FIG. 2, the ordinary photon generated is converted into a light signal, which, upon a light guiding process by the scintillation crystal in the scintillation crystal detector 2, is passed along an optical path 22 and is further collected and converted by the photoelectric multiplier 4 into an electrical signal.

As shown in FIG. 2, the high-energy photon generated is passed further along the optical path 22 to the scintillation crystal in the scintillation crystal detector 2, where it is converted into a ordinary photons via a wave-drifting process, and the ordinary photon, upon a light guiding process by the scintillation crystal in the scintillation crystal detector 2, is passed along an optical path 23 and is further collected and converted by the photoelectric multiplier 4 into an electrical signal.

In addition, a part of light signal, such as ordinary photon, which is generated by the process that the X-ray is incident to the X-ray sensitizing screen 1 and is converted by the scintillation crystal into the scintillation crystal detector 2, is passed along an optical path 24 and is reflected by the reflective layer 5 to be passed along an optical path 25 into the scintillation crystal detector 2, and, upon a light guiding process by the scintillation crystal detector 2, is then collected and converted by the photoelectric multiplier 4 into an electrical signal.

Referring to FIG. 2 again, in the above mentioned embodiment, a part of the backscattered X-ray from the objected being detected, after having interacted with the X-ray sensitizing screen 1, escapes and is then further passed along an optical path 26 to the scintillation crystal detector 2, where a ordinary photons is generated through interaction of X-ray with the scintillation crystal, thereby the part of the backscattered X-ray being converted into a light signal. As shown in FIG. 2, the light line is passed along an optical path 27. Specifically, the light line is reflected at the interface between the sensitizing screen 1 and the scintillation crystal detector 2 and is then passed to and further collected and converted by the photoelectric multiplier 4 into an electrical signal.

In a preferable embodiment, the organic scintillation crystal of polystyrene is doped with a wave-drifting material, such as, Bis-MSB wave-drifting material (chemical name: 1,4-di(ethyl-methylstyryl) benzene, with molecular formula of $C_{24}H_{22}$ and molecular weight of 310.44). In this way, a high-energy photon generated by the organic scintillation crystal or sensitizing screen 1, such as the high-energy photon passed along the optical path 22 or the high-energy photon from the optical path 12, is wave drifted to a wave band where the photoelectric multiplier 4 is sensitive.

Referring to FIG. 2, in order to shielding against a visible light entering into the scintillation crystal detector device 100, the scintillation crystal detector device 100 is provided with a light shielding layer 6 outward to shield external visible light, such as light line 31 from entering into the scintillation crystal detector device 100.

Although the photoelectric multiplier 4 is illustrated to be configured to be coupled to back face of the scintillation crystal detector 2, the present invention is not limited to this and the photoelectric multiplier 4 can be alternatively coupled to a side face of the scintillation crystal detector 2.

With the above construction and configuration, the present invention has the following advantages:

In one embodiment of the present invention, by combining the X-ray sensitizing screen with the scintillation crystal detector, a low-energy backscattered X-ray from the detected object can be detected effectively while the remaining X-ray passing through the X-ray sensitizing screen can be detected by using the scintillation crystal, thereby increasing detection efficiency and measurement accuracy.

In one embodiment of the present invention, on the one hand, the scintillation crystal in the scintillation crystal detector is configured to be interacted with the X-ray so as to convert it into a light signal; on the other hand, the scintillation crystal can be used as a light guide so as to collect and transfer the light signal generated by the X-ray sensitizing screen, thereby increasing usage efficiency of the apparatus, simplifying structure of the apparatus and reducing manufacturing cost of the product.

In one embodiment of the present invention, a wave-drifting technology is employed. Specifically, some wave-drifting material is purposefully added to the scintillation crystal such that the high-energy photon generated by the sensitizing screen can be wave drifted to wave band where the photosensitive device is sensitive, thereby sufficiently increasing detection efficiency and measurement accuracy.

Through the above preferable embodiment, a X-ray sensitizing screen, a scintillation crystal detector, and light guiding and wave-drifting technologies are combined together to obtain a novel scintillation detector, which can improve detection of X-ray, transmission of light signal and conversion of light signal to electrical signal, thereby simplifying structure of the apparatus and reducing cost, while greatly increasing detection efficiency and measurement accuracy of the apparatus.

A X-ray sensitizing screen 1 is sensitive to low-energy X-ray, may produce abundant spectrum lines, has a large light throughput, has a low cost and is easy to be produced as a finished product with a large size. In present invention, it is suitable to apply an X-ray sensitizing screen in a backscattering detector in a large size. In present invention, the scintillation crystal is used as a light guiding medium to effectively collect and transfer the light signal generated by the sensitizing screen 1 while the scintillation crystal in the scintillation crystal detector 2 is sensitive to the X-ray which is interacted with the scintillation crystal, thereby generating a light signal. As such, a part of the X-ray signal not absorbed by the sensitizing screen 1 will be absorbed by the scintillation crystal in the scintillation crystal detector 2 to generate a light signal, which further enhances output of the light signal in whole.

A photosensitive device, such as a photosensitive device in a photoelectric multiplier 4, is typically sensitive in a specific spectrum range. That is, a photosensitive device has low photoelectric conversion efficiency for a light signal at a frequency band higher or lower than the above specific spectrum range. As the sensitizing screen 1 may generate abundant light signals at various frequency bands, much high-energy photon thus can be not converted into an electrical signal. In the present embodiment, by adopting wave-drifting technology, the scintillation crystal in the scintillation crystal detector 2 is purposefully added with a wave-drifting material so as to wave-drift or convert the high-energy photon generated by the sensitizing screen 1 to a frequency band where the photosensitive device is sensitive, thereby enhancing quality of the whole outputting signal.

While the present invention is described with reference to a big backscattering detector, it is not limited to this and can be implemented in similar manner to other types of scintillation detectors, such as a scintillation detector in small size.

Although several embodiments of the general inventive concept are illustrated and explained, it would be appreciated by those skilled in the art that modifications and variations can be made in these embodiments without departing from the principles and spirit of the general inventive concept of the disclosure, the scope of which is defined in the appended claims and their equivalents.

The invention claimed is:

1. A scintillation detector device, comprising:
   a scintillation crystal detector;
   a X-ray sensitizing screen, which is disposed forward the scintillation crystal detector and where a backscattered X-ray from an object to be detected is processed and then at least part of the processed X-ray is incident to the scintillation crystal detector; and
   a photoelectric multiplier, which is disposed backward the scintillation crystal detector and is configured to collect a light signal from the scintillation crystal detector and convert it to an electrical signal.

2. The scintillation detector device according to claim 1, further comprising a reflective layer, which is disposed forward the X-ray sensitizing screen and is configured to reflect a light signal from the X-ray sensitizing screen.

3. The scintillation detector device according to claim 2, further comprising a light shielding layer, which is disposed forward the reflective layer and is configured to shield against a visible light entering into the backscattering scintillation detector device from outside.

4. The scintillation detector device according to claim 3, further comprising a photoelectric coupling medium, which is disposed between the scintillation crystal detector and the photoelectric multiplier and is configured to couple to the light signal transferred between the scintillation crystal detector and the photoelectric multiplier.

5. The scintillation detector device according to claim 4, wherein,
   the photoelectric coupling medium comprises an industrial transparent silicone.

6. The scintillation detector device according to claim 3, wherein,
   the X-ray sensitizing screen can be selected as a metal sensitizing screen, a fluorescent sensitizing screen or a metal-fluorescent composite sensitizing screen.

7. The scintillation detector device according to claim 6, wherein,
   a metal composition of the metal sensitizing screen can be selected as plumbum, tungsten, tantalum, molybdenum, copper or iron.

8. The scintillation detector device according to claim 6, the fluorescent sensitizing screen can be made from calcium tungstate or barium fluochloride.

9. The scintillation detector device according to claim 6, wherein,
   the scintillation crystal detector is made of an organic scintillation crystal of polystyrene.

10. The scintillation detector device according to claim 9, wherein,
    the organic scintillation crystal of polystyrene is doped with a wave-drifting material for wave-drifting of a high-energy photon generated by the organic scintillation crystal or the sensitizing screen to a wave band where the photoelectric multiplier is sensitive.

11. The scintillation detector device according to claim 10, wherein,
    the reflective layer is made of an aluminum foil material.

12. The scintillation detector device according to claim 10, wherein,
    the light shielding layer is made of a black packaging material.

13. The scintillation detector device according to claim 12, wherein,
    the black packaging material comprises a black PET film.

14. The scintillation detector device according to claim 10, wherein,
    the wave-drifting material comprises Bis-MSB.

15. The scintillation detector device according to claim 10, wherein,
    the at least part of X-ray incident to the scintillation crystal detector is interacted with the scintillation crystal in the scintillation crystal detector to be converted into a light signal.

16. The scintillation detector device according to claim 10, wherein,
    a part of backscattered X-ray from the object to be detected is interacted with the X-ray sensitizing screen to be converted into a light signal and, after have been light-guided by the scintillation crystal in the scintillation crystal detector, is passed to and collected by the photoelectric multiplier.

17. The scintillation detector device according to claim 16, wherein,
    the photoelectric multiplier is coupled to a back face or a side face of the scintillation crystal detector.

18. The scintillation detector device according to claim 3, wherein,
    the X-ray sensitizing screen is a rare earth sensitizing screen.

19. The scintillation detector device according to claim 18, wherein,
    the rare earth sensitizing screen is made from a gadolinium sulfide-oxide material.

20. The scintillation detector device according to claim 1, wherein,
    a part of backscattered X-ray from the object to be detected is interacted with the X-ray sensitizing screen and a part of the interacted X-ray is escaped and is interacted with the scintillation crystal in the scintillation crystal detector to be converted into a light signal.

* * * * *